US012747841B2

(12) United States Patent
He

(10) Patent No.: US 12,747,841 B2
(45) Date of Patent: Sep. 29, 2026

(54) CEILING LAMP MOUNTING STRUCTURE AND CEILING LAMP

(71) Applicants: SUZHOU OPPLE LIGHTING CO., LTD., Suzhou City (CN); OPPLE LIGHTING CO., LTD., Shanghai (CN)

(72) Inventor: Jianzhi He, Suzhou City (CN)

(73) Assignees: Suzhou Opple Lighting Co., Ltd., Suzhou City (CN); Opple Lighting Co., Ltd., Shanghai (CN)

( * ) Notice: Subject to any disclaimer, the term of this patent is extended or adjusted under 35 U.S.C. 154(b) by 260 days.

(21) Appl. No.: 18/658,994

(22) Filed: May 9, 2024

(65) Prior Publication Data

US 2024/0288134 A1 Aug. 29, 2024

Related U.S. Application Data

(63) Continuation of application No. PCT/CN2022/127606, filed on Oct. 26, 2022.

(30) Foreign Application Priority Data

Nov. 9, 2021 (CN) ......................... 202111320232.1
Nov. 9, 2021 (CN) ......................... 202122727472.5

(51) Int. Cl.
*F21S 8/04* (2006.01)
*F21V 17/08* (2006.01)
(Continued)

(52) U.S. Cl.
CPC .............. *F21S 8/043* (2013.01); *F21V 17/08* (2013.01); *F21V 17/162* (2013.01); *F21V 21/03* (2013.01); *F21V 21/34* (2013.01)

(58) Field of Classification Search
CPC .. F21S 8/043; F21S 8/04; F21V 17/08; F21V 17/162; F21V 21/03; F21V 21/34; F21V 17/18; F21V 21/36
See application file for complete search history.

(56) References Cited

U.S. PATENT DOCUMENTS

2022/0299198 A1* 9/2022 Feng ........................ F21V 21/22
2024/0240779 A1* 7/2024 Xie ......................... F21V 21/36

FOREIGN PATENT DOCUMENTS

CN 213686373 U 7/2021
CN 213955128 U 8/2021
(Continued)

OTHER PUBLICATIONS

International Search Report of PCT/CN2022/127606 dated Jan. 28, 2023 with English translation.

*Primary Examiner* — Kevin Quarterman
(74) *Attorney, Agent, or Firm* — Arch & Lake LLP

(57) ABSTRACT

A ceiling lamp mounting structure and a ceiling lamp. The ceiling lamp mounting structure comprises a bottom frame assembly, a sliding assembly and a connecting assembly, the bottom frame assembly being fixed on a mounting wall, the connecting assembly being fixedly connected to a lamp body, and the connecting assembly being detachably connected to the bottom frame assembly by means of the sliding assembly. The sliding assembly comprises a sliding rail and a sliding rod, the sliding rail being fixedly connected to the bottom frame assembly, one end of the sliding rod being movably connected to the sliding rail, and the other end of the sliding rod being rotatably connected to the connecting assembly.

10 Claims, 11 Drawing Sheets

(51) Int. Cl.

| | |
|---|---|
| ***F21V 17/16*** | (2006.01) |
| ***F21V 21/03*** | (2006.01) |
| ***F21V 21/34*** | (2006.01) |

(56) References Cited

FOREIGN PATENT DOCUMENTS

| | | | |
|---|---|---|---|
| CN | 113587056 | A | 11/2021 |
| CN | 113932174 | A | 1/2022 |
| CN | 216591361 | U | 5/2022 |
| JP | 2020087642 | A | 6/2020 |

* cited by examiner

CEILING LAMP MOUNTING STRUCTURE AND CEILING LAMP

CROSS REFERENCES TO RELATED APPLICATIONS

This application is based upon and claims the priority of PCT patent application No. PCT/CN2022/127606 filed on Oct. 26, 2022 which claims priority to the Chinese patent application No. 202111320232.1 filed on Nov. 9, 2021 and the Chinese patent application No. 202122727472.5 filed on November 9, the entire contents of which are hereby incorporated by reference herein for all purposes.

TECHNICAL FIELD

The present disclosure relates to the technical field of ceiling lamps, and in particular to a ceiling lamp mounting structure and a ceiling lamp.

BACKGROUND

In the current environment, decorative ceiling lamps have relatively large and heavy lamp bodies because of the influence of product styling.

SUMMARY

The present disclosure provides a ceiling lamp mounting structure and a ceiling lamp.

According to a first aspect, the present disclosure provides a ceiling lamp mounting structure, the ceiling lamp mounting structure may include a bottom frame assembly, a sliding assembly, and a connection assembly, the bottom frame assembly may be fixed on a mounting wall, the connection assembly may be fixedly connected with a lamp main body, the connection assembly may be detachably connected with the bottom frame assembly through the sliding assembly, the sliding assembly includes a sliding rail and a sliding rod, the sliding rail may be fixedly connected with the bottom frame assembly, one end of the sliding rod may be movably connected with the sliding rail, and the other end of the sliding rod may be rotatably connected with the connection assembly.

According to another aspect, the present disclosure provides a ceiling lamp, the ceiling lamp includes a lamp main body and the above-mentioned ceiling lamp mounting structure, the lamp main body may include a chassis, the chassis may include a bottom surface and a side wall extending from the bottom surface in a direction away from the lamp main body, the side wall and the bottom surface may delimit a receiving cavity, the ceiling lamp mounting structure may be received in the receiving cavity, and the bottom frame assembly of the ceiling lamp mounting structure may be fixedly connected with the side wall of the chassis.

It is to be understood that both the foregoing general description and the following detailed description are exemplary and explanatory only and are not restrictive of the present disclosure.

BRIEF DESCRIPTION OF DRAWINGS

The technical solutions and other beneficial effects of the present disclosure will be understood through the description of the examples of the present disclosure in conjunction with the accompanying drawings.

DETAILED DESCRIPTION

Figure 1:
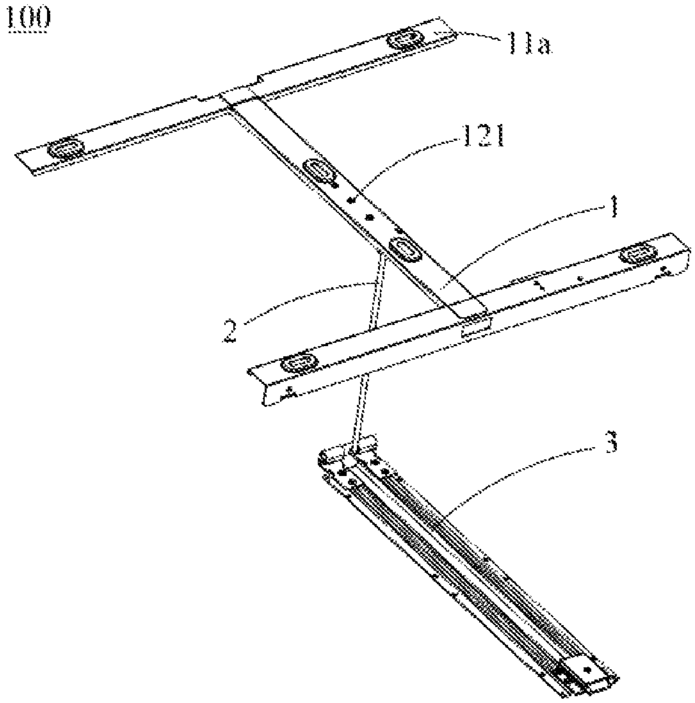
FIG. 1 is a schematic structural diagram of a ceiling lamp mounting structure in accordance with an example of the present disclosure.

In order to make the purpose, technical scheme and advantages of this disclosure clear, this disclosure will be described in detail with the attached drawings and examples.

Here, it should be noted that in order to avoid obscuring the present invention with unnecessary details, only the structures and/or processing steps closely related to the scheme of the present invention are shown in the attached drawings, while other details that are not related to the present invention are omitted.

In addition, it should be noted that the terms “comprising”, “comprise”, “including”, “include” or any other variation thereof are intended to cover non-exclusive inclusion, so that a process, method, article or device including a series of elements includes not only those elements, but also other elements not explicitly listed, or elements inherent to such process, method, article or device.

When mounting a lighting fixture, in addition to lifting the lighting fixture up by hand, connecting the mains power and fixing the lighting fixture are further needed. Under some circumstances, a single person cannot complete the above three steps at the same time. Moreover, after-sales maintenance of the large ceiling lamp is also inconvenient.

In view of this, it is indeed necessary to provide a ceiling lamp mounting structure and a ceiling lamp to solve the above problems.

Please refer to FIG. 1 to FIG. 16, a ceiling lamp mounting structure 100 is provided by the present disclosure, the ceiling lamp mounting structure 100 includes a bottom frame assembly 1, a sliding assembly 2, and a connection assembly 3. The bottom frame assembly 1 is mounted on the mounting wall, the connection assembly 3 is fixedly connected with a lamp main body 201, the connection assembly 3 is detachably connected with the bottom frame assembly 1 through the sliding assembly 2, the sliding assembly 2 includes a sliding rail 21 and a sliding rod 22, the sliding rail 21 is fixedly connected with the bottom frame assembly 1, one end of the sliding rod 22 is movably connected with the sliding rail 21, and the other end of the sliding rod 22 is rotatably connected with the connection assembly 3. The aforementioned mounting wall may be a ceiling or other mounting surface, such as a wall, etc. By arranging that the sliding assembly 2, the connection assembly 3, and the bottom frame assembly 1 cooperate with each other, the pre-hanging of the ceiling lamp 200 is realized, and a single person can complete the connection with the mains power and the mounting of the ceiling lamp 200, thereby achieving that a single person can complete the quick mounting of the large ceiling lamp 200, and facilitating after-sales maintenance.

Figure 2:
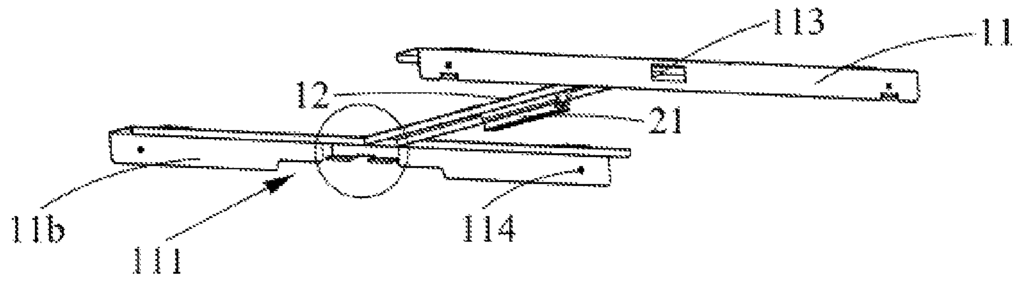
FIG. 2 is a schematic structural diagram of a bottom frame assembly and a sliding rail.
Figure 3:
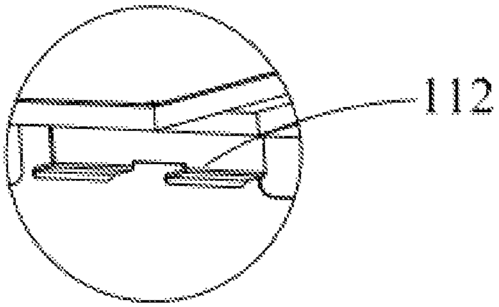
FIG. 3 is an enlarged structural view of a circled portion in FIG. 2.

Specifically, please refer to FIG. 1 to FIG. 3, the bottom frame assembly 1 is made of conventional plates and can be made into a required shape, such as round, square, etc., according to customer requirements and mounting environment, the present disclosure does not limit this. Preferably, the bottom frame assembly 1 is an "I"-shaped structure formed by using metal plate as raw material. The bottom frame assembly 1 is fixedly mounted on the mounting wall through fasteners such as screws. The bottom frame assembly 1 includes a first fixing arm 11 and a second fixing arm 12, the first fixing arm 11 and the second fixing arm 12 are arranged vertically. In an example, the number of the first fixing arms 11 is two, the number of the second fixing arm 12 is one, the first fixing arms 11 and the second fixing arm 12 form an "I"-shaped structure. The second fixing arm 12 is provided with a first plug-in hole 121. In the present disclosure, the shapes and numbers of the first fixing arms 11 and the second fixing arms 12 are only exemplary and should not be limited thereto.

It can be known that a size of the bottom frame assembly 1 can be determined according to an actual size of the lamp main body 201, and the size of the bottom frame assembly 1 is smaller than a size of a chassis 4 on the lamp main body 201, so as to receive the ceiling lamp mounting structure 100 in a receiving cavity 43 of the chassis 4 to improve external aesthetics of the ceiling lamp 200.

Further, the first fixing arm 11 includes a first plate 11*a* and a second plate 11*b* arranged at an angle, the first plate 11*a* is fixedly connected with the second fixing arm 12, the second plate 11*b* is formed by extending downward from an end of the first plate 11*a* away from the second fixing arm 12. Preferably, the first plate 11*a* and the second plate 11*b* have a right-angle structure.

The second plate 11*b* of the first fixing arm 11 corresponding to an auxiliary piece 32 is provided with a keep-space portion 111, and a shape of the keep-space portion 111 matches with a shape of an end of the auxiliary piece 32 away from a locking assembly 33. A second buckle portion 112 is provided above the keep-space portion 111. The second buckle portion 112 is in a buckle connection with a first buckle portion 323 on the auxiliary portion 32, which is used to fixedly connect the connection assembly 3 with the bottom frame assembly 1, thereby realizing a fixing between one side of the lamp main body 201 and the bottom frame assembly 1. In this example, the second buckle portion 112 is formed by bending and extending the second plate 11*b* in a direction away from the second fixing arm 12. In other examples, the second buckle portion 112 can further be of other shapes, which can be set according to actual requirements, and is not further limited in the present disclosure. In addition, the first fixing arm 11 away from the second buckle portion 112 is provided with a locking opening 113, that is, the second plate 11*b* of the first fixing arm 11 corresponding to the locking assembly 33 is provided with the locking opening 113. The first fixing arm 11 is further provided with a first mounting hole 114, and a second mounting hole 411 is provided in a side wall of the chassis 4, a fastener such as a screw passes through the second mounting hole 411 and the first mounting hole 114, so as to realize a fixed connection between the bottom frame assembly 1 and the chassis 4.

Please refer to FIG. 1 to FIG. 10, the sliding assembly 2 is connected with the bottom frame assembly 1 and the connection assembly 3, respectively, and the connection assembly 3 is fixedly connected with the bottom frame assembly 1 through the sliding assembly 2. The sliding assembly 2 includes a sliding rail 21 and a sliding rod 22, the sliding rod 22 can move relatively on the sliding rail 21. Preferably, a central axis of the sliding rail 21 is parallel to a central axis of the connection assembly 3. With such an arrangement, the sliding rod 22 can be received in the second receiving portion 212, thereby making the mounting of the lamp main body 201 more convenient and improving the mounting efficiency. Specifically, the sliding rail 21 includes a first receiving portion 211 and a second receiving portion 212, the second receiving portion 212 is formed by vertically extending from the first receiving portion 211 in a direction away from the bottom frame assembly 1. In an example, an interior of the first receiving portion 211 is a cylindrical cavity structure, and a smooth curved surface structure can make the sliding rod 22 slide more smoothly, thereby improving the mounting efficiency. In other examples, the interior of the first receiving portion 211 may be an ellipse, a triangle, a rectangle, or other structures, which may be set according to actual requirements, and the present disclosure will not further limit this.

Further, a projection area of the connection portion between the first receiving portion 211 and the second receiving portion 212 on the sliding rail 21 is smaller than a projection area of the first receiving portion 211 on the sliding rail 21 to limit the plug-in portion 23 in the first receiving portion 21. In this way, a stability of the plug-in portion 23 in the first receiving portion 211 can be ensured, and the plug-in portion 23 can be prevented from slipping, thereby improving the safety of a mounting process. Moreover, it can further save materials and reduce a production cost. In other examples, the entire side wall of the sliding rail 21 may have a linear structure. Preferably, the first receiving portion 211 and the second receiving portion 212 are of an integrally formed structure.

The sliding rail 21 is further provided with a second plug-in hole 2111 and a third plug-in hole 2121, the second plug-in hole 2111 is located at a side where the first receiving portion 211 is in contact with the second fixing arm 12, the second plug-in hole 2111 is matched with the first plug-in hole 121. A third plug-in hole 2121 is located at a side of the sliding rail 21 close to the locking opening 113, and the third plug-in hole 2121 is provided in a side wall of the second receiving portion 212.

An end of the sliding rod 22 close to the sliding rail 21 is connected with a plug-in portion 23, the plug-in portion 23 is located in the first receiving portion 211 and is matched with the first receiving portion 211. The plug-in portion 23 is fixedly connected with the sliding rod 22, a part of the sliding rod 22 is located in the second receiving portion 212, the plug-in portion 23 is driven by the sliding rod 22 to relatively slide in the first receiving portion 211. Further, two ends of the sliding rod 22 are respectively bent to form a first bending portion 221 and a second bending portion 222, the first bending portion 221 and the second bending portion 222 are formed by bending the sliding rod 22 in the same direction, the first bending portion 221, a main body of the sliding rod 22, and the second bending portion 222 are connected end to end to facilitate the mounting operation of the ceiling lamp 200, the structure is simple and easy to operate, which reduces a production and mounting cost.

The first bending portion 221 is plugged into the plug-in portion 23, it can be known that the plugging-in connection between the first bending portion 221 and the plug-in portion 23 is fixed. A specific length of the sliding rod 22 can be set according to actual mounting requirements, which is not further limited in the present disclosure, as long as the lamp main body 201 can be visually connected with the mains power. The plug-in portion 23 is matched with an internal structure of the first receiving portion 211. In an example, the plug-in portion 23 has a hollow spherical structure. A design of the hollow spherical structure can facilitate the plugging-in of the first bending portion 221 therein, the plug-in portion 23 and the first bending portion 221 are fixed by welding or other methods to achieve a fixed connection between the first bending portion 221 and the plug-in portion 23.

The ceiling lamp mounting structure of the present disclosure is used for the mounting of the ceiling lamp 200, and is especially suitable for the mounting of a large and heavy ceiling lamp 200, during a mounting process of the large and heavy ceiling lamp 200, in the case where the sliding rod 22 detaches from the sliding rail 21, the personal safety of the mounting person will be most likely threatened. Therefore, the sliding assembly 2 further includes an anti-drop piece 24 and a fixed position-stopping piece 25, the third plug-in hole 2121 is matched with the anti-drop piece 24, and the anti-drop piece 24 is matched with and plugged in the third plug-in hole 2121 for horizontal plugging into the second receiving portion 212, thereby achieving a position limiting of the plug-in portion 23. The arrangement of the anti-drop piece 24 improves the safety of the mounting process. In one example, the anti-drop piece 24 is an anti-drop pin, and a length of the anti-drop pin is greater than a distance between two third plug-in holes 2121. In the case where the anti-drop pin penetrates the second receiving portion 212, the plug-in portion 23 can be limited and fixed. Preferably, a fixing structure can further be added at an outer end of the third plug-in hole 2121 where the anti-drop pin is located, to further prevent the anti-drop pin from falling off from the third plug-in hole 2121 and improve the mounting safety of the ceiling lamp 200. In the case where the ceiling lamp 200 needs to be disassembled, a fixing structure is removed, and the anti-drop pin is pulled out from the third plug-in hole 2121 to achieve quick disassembly of the ceiling lamp 200.

Figure 9:
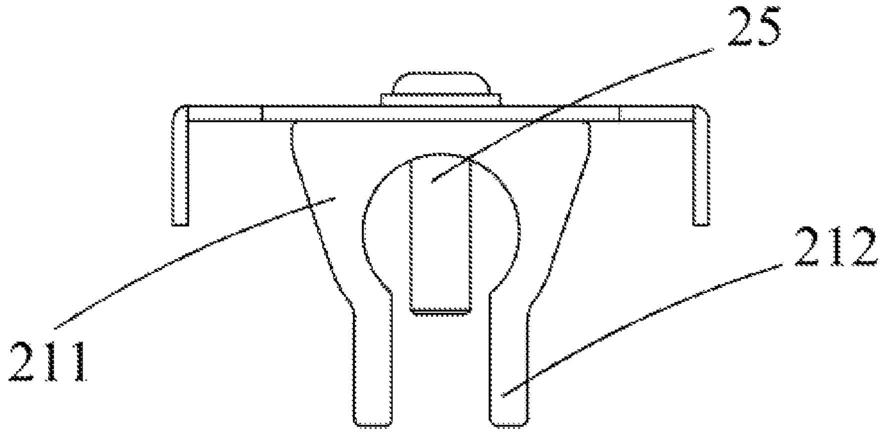
FIG. 9 is a schematic structural diagram of a sliding rail, a fixed position-stopping piece, and a second fixing arm.
Figure 10:
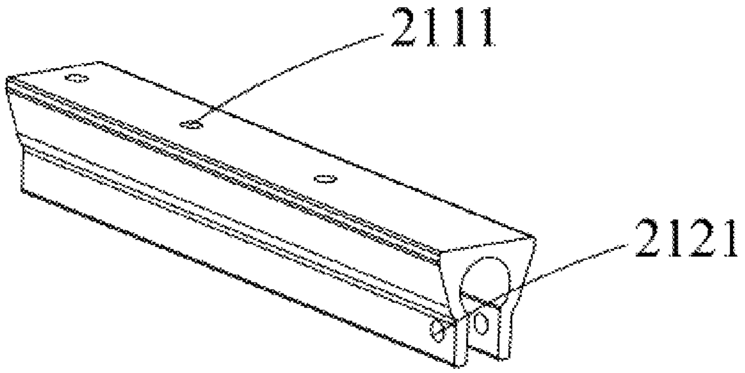
FIG. 10 is a schematic structural diagram of a sliding rail.

Please refer to FIG. 9 in conjunction with FIG. 1, the fixed position-stopping piece 25 passes through the first plug-in hole 121 and the second plug-in hole 2111 in sequence, and is exposed inside the first receiving portion 211. A portion of the fixed position-stopping piece 25 exposed in the first receiving portion 211 is used to limit the maximum displacement of the plug-in portion 23 and thus to limit the maximum displacement of the connection assembly 3. The plug-in portion 23 is driven by the sliding rod 22 to slide relatively in the first receiving portion 211, at the same time, the plug-in portion 23 is driven by the sliding rod 22 to relatively rotate in the first receiving portion 211, so that the connection assembly 3 is driven by the sliding assembly 2 to relatively slide and/or rotate in the first receiving portion 211. In other words, driven by the sliding assembly 2, the connection assembly 3 can firstly slide relatively in the first receiving portion 211, and then rotate relatively in the first receiving portion 211. In addition, driven by the sliding assembly 2, the connection assembly 3 can further realize relative sliding and relative rotation in the first receiving portion 211 at the same time, and can further realize an approach of the lamp main body 201 to the bottom frame assembly 1. The fixed position-stopping piece 25 passes through the first plug-in hole 121 in the second fixing arm 12 and the second plug-in hole 2111 in the sliding rail 21 to limit the position of the plug-in portion 23. An exposed length of the fixed position-stopping piece 25 inside the first receiving portion 211 can be set according to actual needs, and is not further limited in the present disclosure, as long as it can limit the position of the plug-in portion 23.

Preferably, the number of the anti-drop piece 24 is one, and the number of the fixed position-stopping pieces 25 is three. Optionally, the fixed position-stopping piece 25 is a bolt or other element with a fixing and position-stopping function. The structure and number of the anti-drop piece 24 and the fixed position-stopping piece 25 in the present disclosure are only exemplary and should not be limited thereto.

The sliding assembly 2 further includes a rotating shaft 26 and a sleeve piece 27, the rotating shaft 26 passes through the sleeve piece 27 to be matched and connected with the auxiliary piece 32 to achieve a rotational connection between a side of the sliding assembly 2 away from the plug-in portion 23 and the connection assembly 3. Optionally, the plug-in portion 23, the sliding rod 22, and the rotating shaft 26 can be of an integrally formed structure or a spliced structure, in the case where they are of a spliced structure, it is necessary to ensure a stability of the connection between the three components to avoid an occurrence of one or more components falling off, thereby ensuring the safety of the mounting process.

Figure 4:
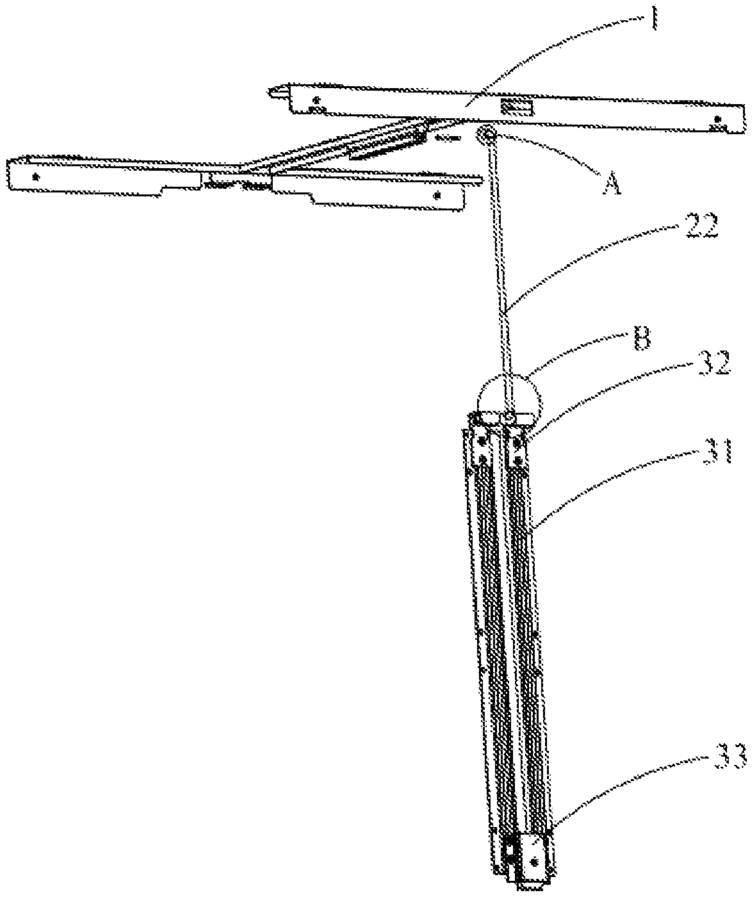
FIG. 4 is a schematic structural diagram of a bottom frame assembly, a sliding assembly, and a connection assembly at an angle.
Figure 5:
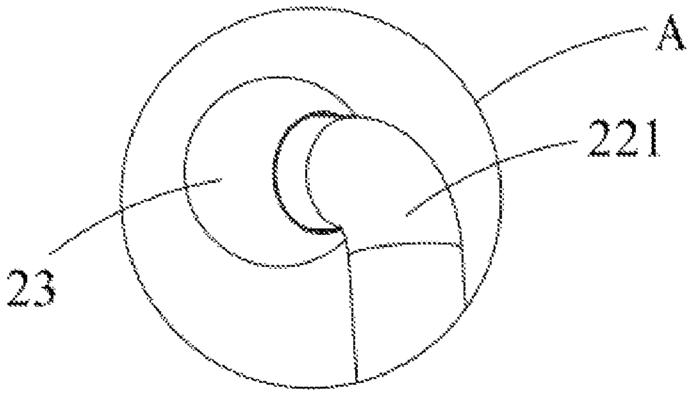
FIG. 5 is an enlarged view of the structure at A in FIG. 4.
Figure 6:
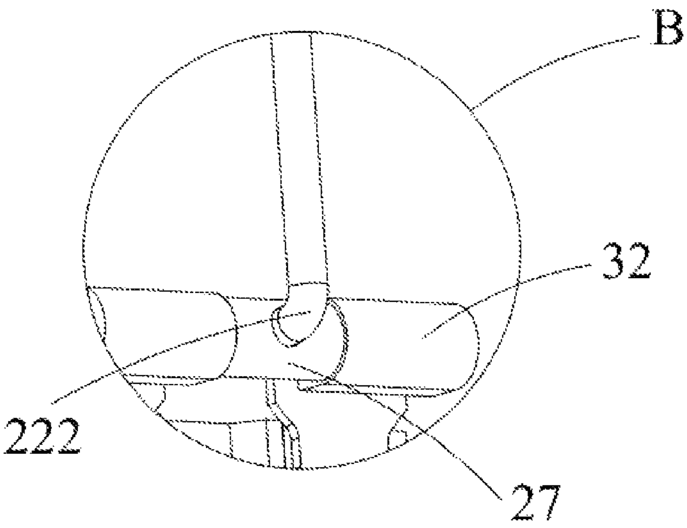
FIG. 6 is an enlarged view of the structure at B in FIG. 4.
Figure 7:
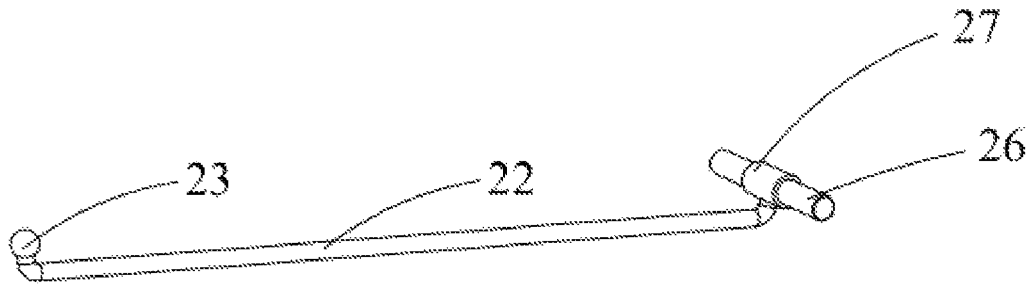
FIG. 7 is a schematic structural diagram of a plug-in portion, a sliding rod, a rotating shaft, and a sleeve piece.
Figure 8:
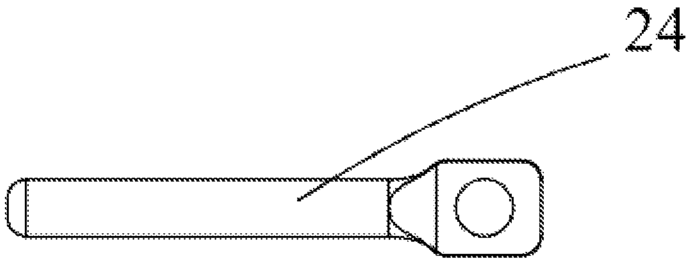
FIG. 8 is a schematic structural diagram of an anti-drop piece.

Please refer to FIG. 4 in conjunction with FIG. 1, the connection assembly 3 is used to connect the lamp main body 201 and the bottom frame assembly 1. The connection assembly 3 includes a supporting piece 31, an auxiliary piece 32, and a locking assembly 33. The auxiliary piece 32 and the locking assembly 33 are fixedly connected with two ends of the supporting piece 31, respectively, an end of the auxiliary piece 32 away from the locking assembly 33 is rotatably connected with an end of the sliding rod 22 away from the plug-in portion 23. The supporting piece 31 is of a plate-shaped structure. Preferably, the supporting piece 31 is two supporting plates, and a gap is between the two supporting plates.

Figure 11:
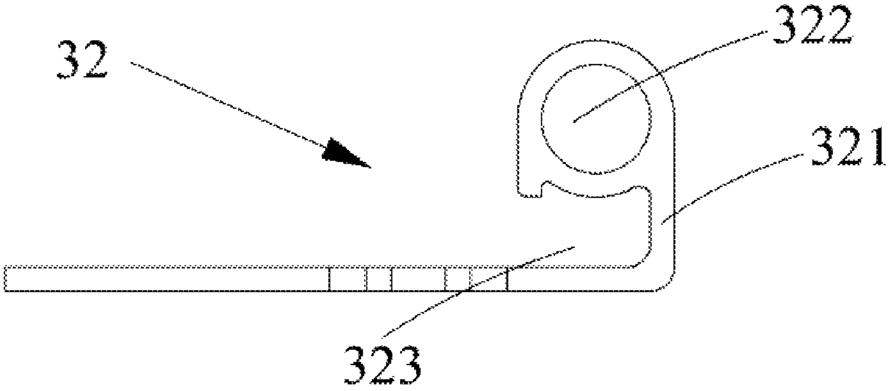
FIG. 11 is a schematic structural diagram of an auxiliary piece.
Figure 12:
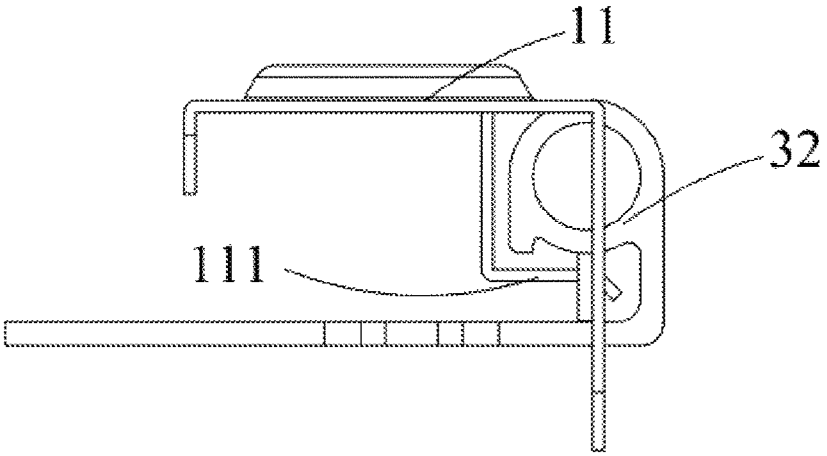
FIG. 12 is a connection relationship diagram between the auxiliary piece and a second buckle portion.

As shown in FIG. 11 to FIG. 12, an end of the auxiliary piece 32 extends vertically upward to form a vertical portion 321, and is curled toward a direction of the supporting piece 31 to form a plug-in channel 322, the plug-in channel 322 is matched with the rotating shaft 26, and receives the rotating shaft 26 inside. The rotating shaft 26 is used to realize a rotation connection between the second bending portion 222 and the auxiliary piece 32. A horizontal portion of the auxiliary portion 32, the vertical portion 321, and an outer wall of the plug-in channel 322 delimit a first buckle portion 323, the first buckle portion 323 is connected with the second buckle portion 112 of the bottom frame assembly 1 in a buckle manner. The first buckle portion 323 is used to receive the second buckle portion 112 therein to realize a hooking of the auxiliary piece 32 on the bottom frame assembly 1.

Figure 13:
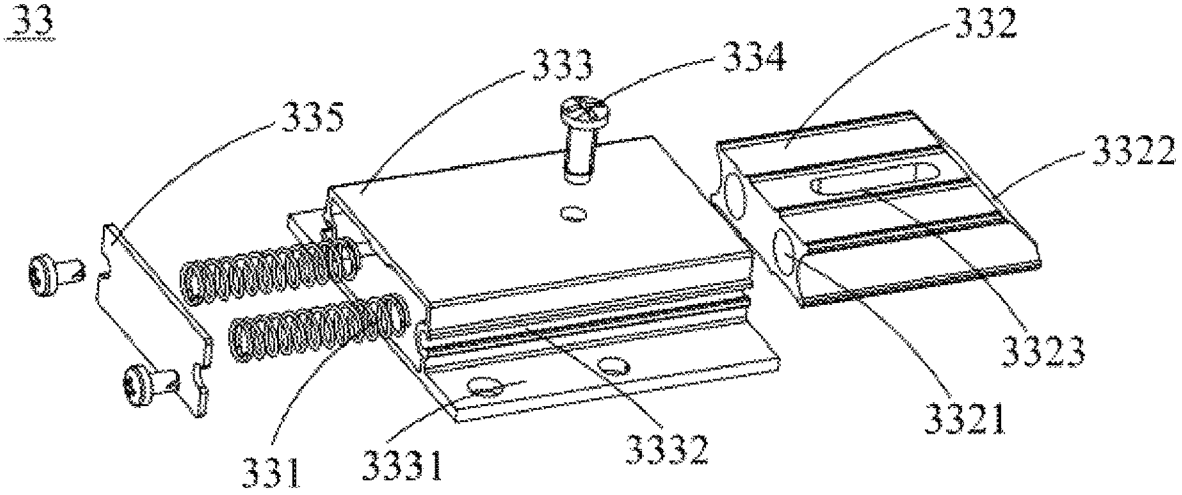
FIG. 13 is an exploded view of a locking assembly.
Figure 14:
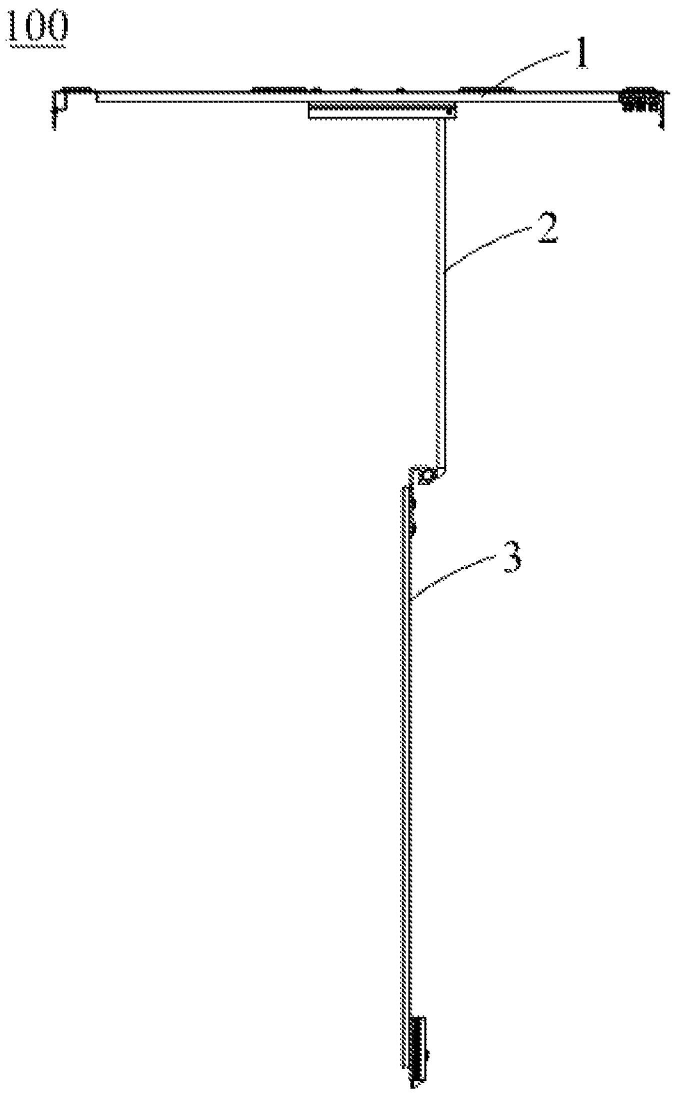
FIG. 14 is a connection relationship diagram between the bottom frame assembly, the sliding assembly, and the connection assembly in a natural state.
Figure 15:
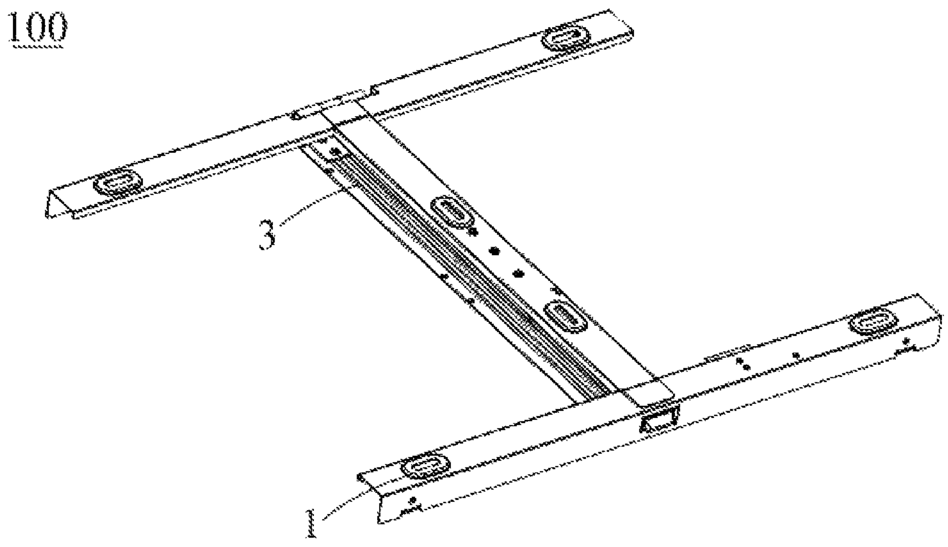
FIG. 15 is a connection relationship diagram between the bottom frame assembly, the sliding assembly, and the connection assembly after mounting is completed.
Figure 16:
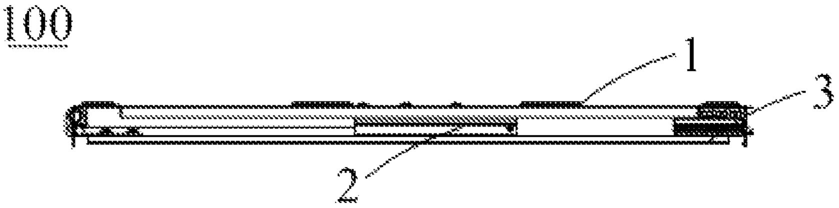
FIG. 16 is a left side view of FIG. 15.

Please refer to FIG. 13 in conjunction with FIG. 1 and FIG. 15 to FIG. 16, the locking assembly 33 is connected with the bottom frame assembly 1 through the locking opening 113 in a locking catch manner to realize a self-locking connection effect between a right side of the lamp main body 201 and the bottom frame assembly 1. It can be known that the locking opening 113 is located at a position of the bottom frame assembly 1 corresponding to an end of the locking assembly 33 away from the auxiliary piece 32. The locking assembly 33 includes an elastic piece 331, a locking tongue 332, a locking tongue sleeve 333 for receiving the locking tongue 332, and a fixing piece 334, the locking tongue sleeve 333 includes a flat plate 335 and a horizontal portion 3331, the horizontal portion 3331 is fixedly connected with the supporting piece 31. The elastic piece 331 is located in the locking tongue 332. Under external extrusion, the elastic piece 331 is compressed, and the locking tongue 332 is received in the locking tongue sleeve 333. In the case where the external force is removed, the locking tongue 332 returns to its original position under clastic force of the clastic piece 331. The aforementioned external force is specifically squeezing force of the first fixing arm 11 when the locking assembly 33 moves to abut against the first fixing arm 11.

Further, in an example, the locking tongue 332 is provided with a matching hole 3321 at a side close to the flat plate 335, one end of the elastic piece 331 is matched and connected with the matching hole 3321, and the other end of the elastic piece 331 abuts against an inner wall of the flat plate 335, the locking tongue 332 is elastically connected with the flat plate 335 through the elastic piece 331. In other examples, the matching hole 3321 can further be replaced by a matching rod, the matching rod is formed by the locking tongue 332 protruding and extending toward a direction of the flat plate 335 at a side close to the flat plate 335, one end of the elastic piece 331 is matched and sleeved on the outer side of a periphery portion of the matching rod.

In addition, when disassembling and/or replacing the ceiling lamp 200, the locking tongue 332 can be pressed by an external force, so that the locking tongue 332 is moved out of the locking opening 113 and retracted into the locking tongue sleeve 333 to release the fixing between the connection assembly 3 and the bottom frame assembly, and in this way, the after-sales maintenance is facilitated.

In an example, the locking tongue 332 is provided with a guiding portion 3322, and a cross-sectional area of the guiding portion 3322 gradually increases in a direction close to the flat plate 335, with this arrangement, the locking tongue 332 can be guided to enter the locking opening 113 more easily, which makes the self-locking connection between the connection assembly 3 and the bottom frame assembly 1 faster. When replacing and/or disassembling the ceiling lamp 200, only need to press the guiding portion 3322 and withdraw it from the locking opening 113, the fixing between the right side of the lamp main body 201 and the bottom frame assembly 1 can be released, the operation is simple and efficient.

Please refer to FIG. 13, the locking tongue 332 is provided with a sliding groove 3323 that is matched with the fixing piece 334, the fixing piece 334 passes through the locking tongue sleeve 333 and is exposed in the sliding groove 3323, the fixing piece 334 moves relatively in the sliding groove 3323 under an action of an external force. In other words, the locking tongue 332 is slidably connected with the locking tongue sleeve 333 by a relatively sliding of the fixing piece 334 in the sliding groove 3323. It can be known that a length of the sliding groove 3323 is a maximum displacement of the locking tongue 332. The arrangement of the fixing piece 334 can prevent the locking tongue 332 from being separated from the locking assembly 33 under the action of the elastic piece 331, thereby improving stability of the locking assembly 33, and then improving security of the mounting process. Optionally, the fixing piece 334 is a rivet or other elements that can realize a position-blocking function.

Preferably, the number of the elastic pieces 331 is two, and the two elastic pieces 331 are symmetrically arranged on two sides of the fixing piece 334. Optionally, the elastic piece 331 is a spring. Optionally, a central axis of the sliding groove 3323 coincides with a central axis of the two matching holes 3321.

The flat plate 335 and the guiding portion 3322 are located on both sides of the locking tongue sleeve 333, respectively, and the flat plate 335 is matched and connected with the sliding channel 3332 of the locking tongue sleeve 333. A sidewall of the flat plate 335 is provided with an arc groove, and elements such as the rivet is inserted into the sliding channel 3332 through the arc groove to restrict the elastic piece 331 in the locking tongue sleeve 333.

Figure 17:
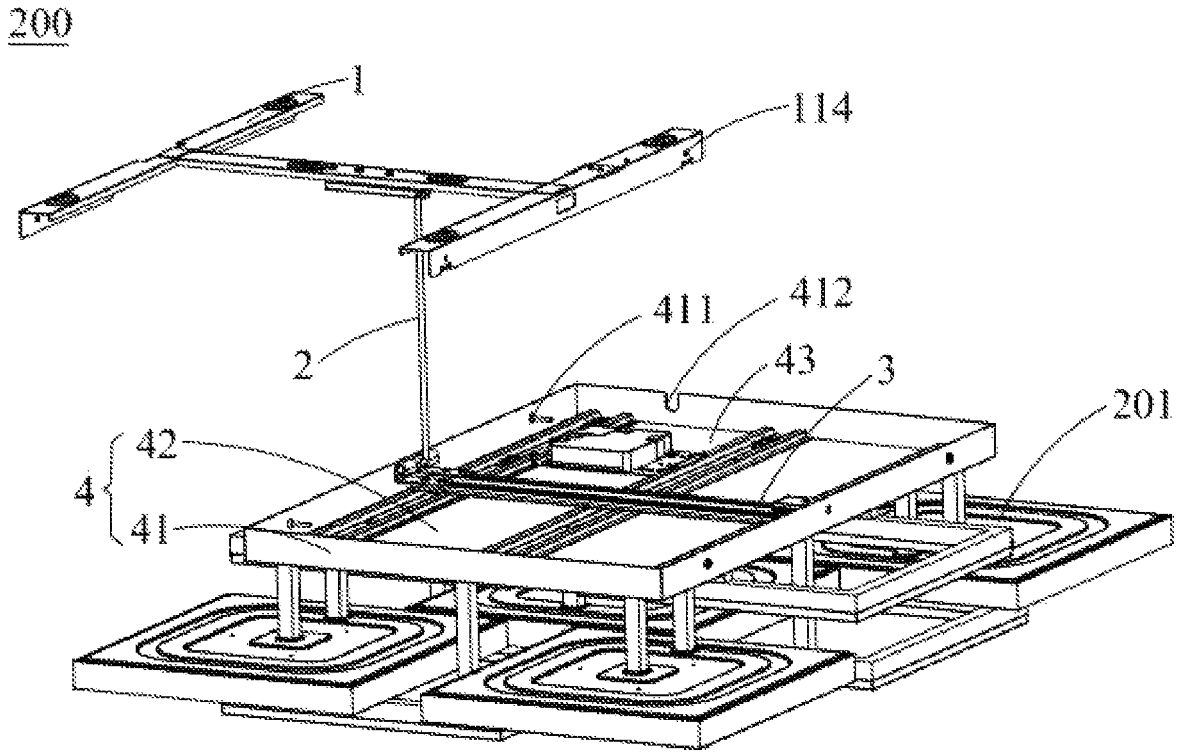
FIG. 17 is a schematic structural diagram of a ceiling lamp in accordance with an example of the present disclosure.
Figure 18:
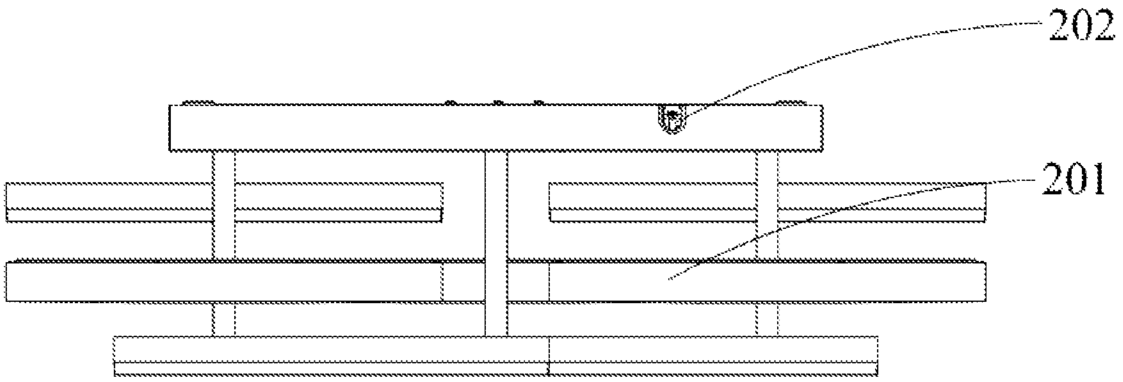
FIG. 18 is a schematic structural diagram of the ceiling lamp at the first angle.
Figure 19:
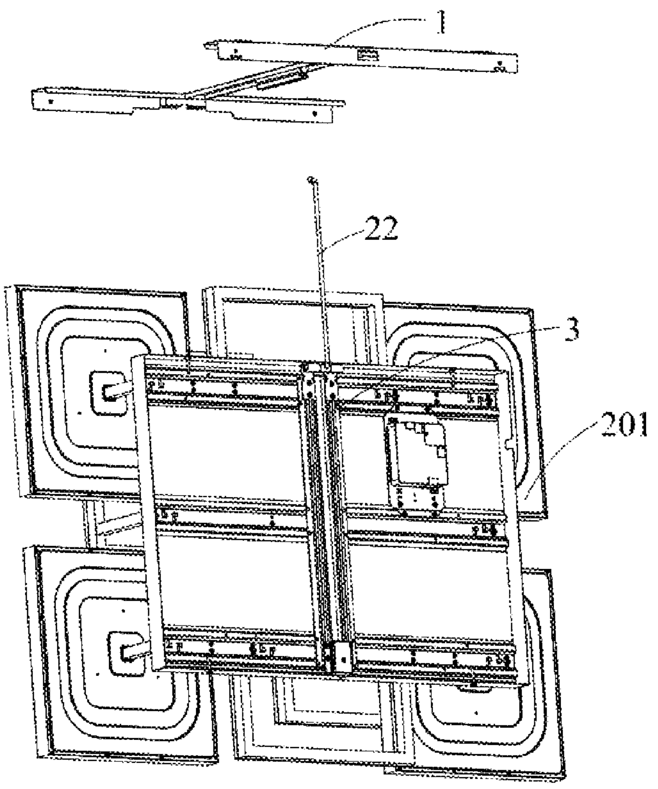
FIG. 19 is a schematic structural diagram of the ceiling lamp in the first mounting state.
Figure 20:
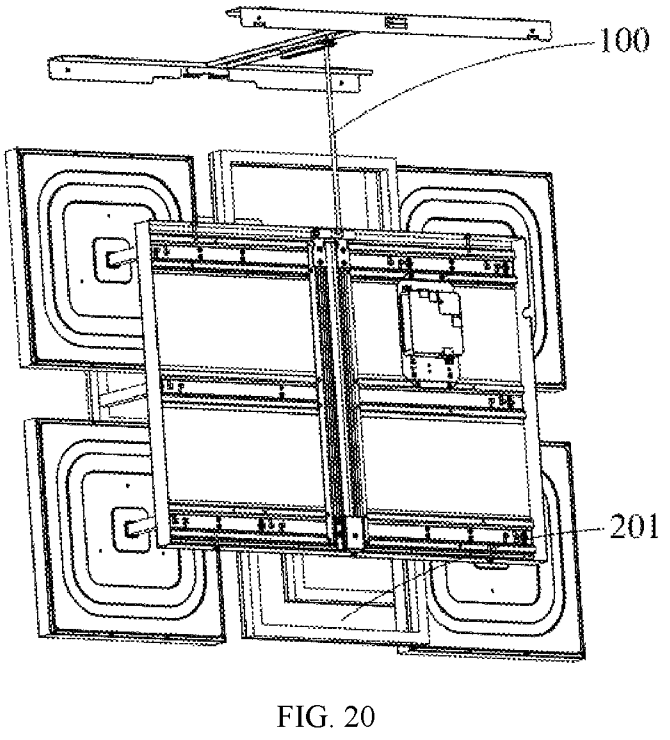
FIG. 20 is a schematic structural diagram of the ceiling lamp in the second mounting state.
Figure 21:
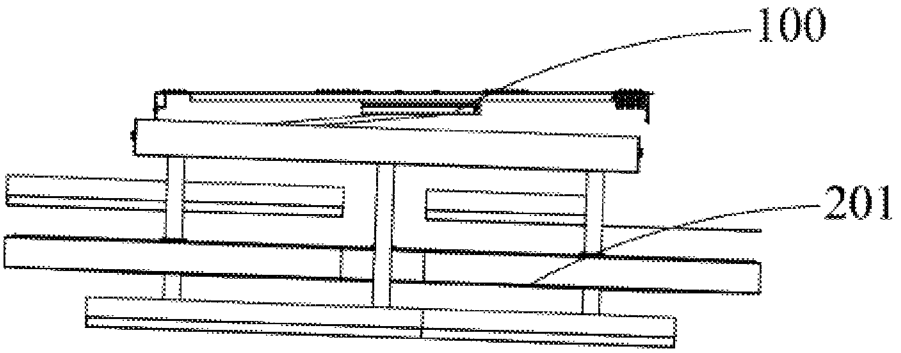
FIG. 21 is a schematic structural diagram of the ceiling lamp in the third mounting state.
Figure 22:
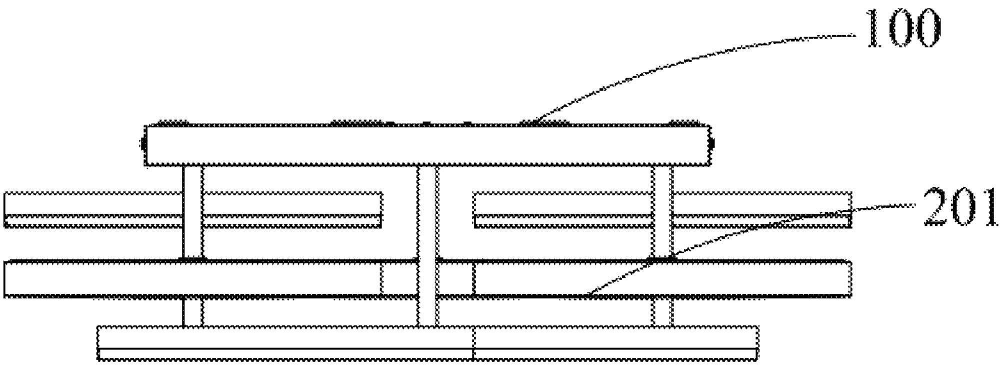
FIG. 22 is a schematic structural diagram of the ceiling lamp in a case of mounting is completed.

Referring to FIG. 17 to FIG. 18, the present disclosure further discloses a ceiling lamp 200, the ceiling lamp 200 includes the aforementioned ceiling lamp mounting structure 100, the connection assembly 3 of the ceiling lamp mounting structure 100 is fixed on the lamp main body 201. The lamp main body 201 includes a receiving cavity 43, and the ceiling lamp mounting structure 100 is received in the receiving cavity 43. The connection assembly 3 is detachably connected with the bottom frame assembly 1 through the sliding assembly 2. The connection assembly 3 and the lamp main body 201 can be provided separately or integrally. Preferably, the connection assembly 3 is integrated with the lamp main body 201, with this arrangement, the cost can be can reduced, the reliability of the connection between the connection assembly 3 and the lamp main body 201 can be improved, the safety of the mounting process of the ceiling lamp 200 can be improved, and the service life of the ceiling lamp 200 can be improved.

The lamp main body 201 includes a chassis 4, which is fixedly connected with the bottom frame assembly 1 and the connection assembly 3 of the ceiling lamp mounting structure 100, respectively. The chassis 4 is provided with a receiving cavity 43 to receive the ceiling lamp mounting structure 100, so that an entire lamp has a beautiful appearance and improves user's experience. The chassis 4 includes a side wall 41 and a bottom surface 42, and the side wall 41 and the bottom surface 42 delimit the receiving cavity 43. The side wall 41 is provided with a second mounting hole 411 at a position corresponding to the first mounting hole 114, fasteners such as a screw passes through the second mounting hole 411 and the first mounting hole 114 to realize the fixed connection between the bottom frame assembly 1 and the chassis 4. The connection assembly 3 is fixedly connected with the bottom surface 42 through fasteners.

In addition, the ceiling lamp 200 is further provided with a WiFi module 202, the WiFi module 202 is located on the side wall 41 of the chassis 4, the side wall 41 is provided with a placement hole 412, and the WiFi module 202 is clamped on the placement hole 412. A user can transmit a target control command to the ceiling lamp 200 through the WiFi module 202 by a corresponding mobile phone APP, thereby realizing a remote control of the ceiling lamp 200, which is highly intelligent and improves the user's experience.

It should be noted that in order to make up for the inconvenience of mounting and maintenance of existing ceiling lamps, the ceiling lamp mounting structure 100 of the present disclosure and the lamp main body 201 of the ceiling lamp 200 can be independently mounted and sold independently, thereby improving a universality of the structure of each part of the ceiling lamp 200.

Please refer to FIG. 19 to FIG. 22, the mounting of the ceiling lamp 200 of the present disclosure has advantages of high visibility, high safety, high efficiency, and can be mounted and disassembled by a single person. The mounting method of the ceiling lamp 200 specifically includes the following steps.

S1: fixing the bottom frame assembly 1 on the mounting wall.

S2: hanging the lamp main body 201 on the bottom frame assembly 1.

S3: connecting to mains power.

S4: pushing the lamp main body 201 to the left firstly until the plug-in portion 23 reaches the maximum displacement, and then pushing the lamp main body 201 upward to a target position.

S5: Pulling the lamp main body 201 laterally to the right, so that the plug-in portion 23 is reset, at this time, the auxiliary piece 32 of the lamp main body 201 is fixed on the bottom frame assembly 1, and then pushing the lamp main body 201 upward to fix the locking assembly 33 on the bottom frame assembly 1.

What can be known is that because the ceiling lamp 200 is already in a pre-hanging state, at this time, a person in charge of mounting can free his hands to connect with the mains power. The entire mounting process has high visibility and high safety, a single person can perform a connection of the mains power without a need for an auxiliary person to transfer items, and there is no need for the person in charge of mounting to go up and down many times, the operation is simple, efficient, and saves time and effort.

Further, step S2 specifically includes the following steps.

S21: fixing the connection assembly 3 on the lamp main body 201, and fixing the sliding rod 22 of the sliding assembly 2 on the connection assembly 3 through a rotating shaft 26.

S22: plugging the plug-in portion 23 of the sliding assembly 2 into the first receiving portion 211, and making that the anti-drop piece 24 crosses the third plug-in hole 2121 of the second receiving portion 212 to hang the lamp main body 201 on the bottom frame assembly 1, thereby realizing the pre-hanging of the lamp main body 201.

Further, step S4 specifically includes the following steps.

S41: pushing the lamp main body 201 to the left firstly until the plug-in portion 23 reaches the maximum displacement.

S42: pushing the left side of the lamp main body 201 upward to the target position.

Further, step S5 specifically includes the following steps.

S51: pulling the lamp main body 201 laterally to the right to reset the plug-in portion 23, at this time, the first buckle portion 323 is hooked on the second buckle portion 112, thereby realizing a hooking of the auxiliary portion 32 of the lamp main body 201 to the bottom frame assembly 1.

S52: pushing the lamp main body 201 upward, when the locking assembly 33 abuts against the inner wall of the first fixing arm 11, because of an extrusion force, the elastic piece 331 of the locking assembly 33 is compressed, so that the locking tongue 332 is retracted into the locking tongue sleeve 333.

S53: continuing to push the lamp main body 201 until the locking tongue 332 corresponds to the locking opening 113, and the extrusion force disappears, at this time, the locking tongue 332 is reset under the elastic force of the elastic piece 331, and the locking tongue 332 is inserted into the locking opening 113, so that the locking assembly 33 is connected with the bottom frame assembly 1 in a locking catch manner.

Further, step S6 further includes the following steps.

S6: using fasteners such as a screw to pass through the second mounting hole 411 and the first mounting hole 114 to fixedly connect the bottom frame assembly 1 with the chassis 4 of the lamp main body 201, thereby completing the mounting and fixing of the lamp main body 201.

In summary, the present disclosure realizes the pre-hanging of the ceiling lamp 200 through the cooperation of the sliding assembly 2, the connection assembly 3, and the bottom frame assembly 1, and a single person can complete the connection with the mains power and the fixing of the ceiling lamp 200, thereby realizing the quick mounting of a large ceiling lamp 200 by a single person, and facilitating after-sales maintenance. Moreover, by arranging the first buckle portion 323 and the second buckle portion 112, the lamp main body 201 is hooked on the bottom frame assembly 1, thereby freeing both hands to realize connection of the mains power. By arranging that the locking assembly 33 is connected with the locking opening 113 in a locking catch manner, the self-locking connection effect between the lamp main body 201 and the bottom frame assembly 1 is achieved. Furthermore, by providing the anti-drop piece 24, the stability of the plug-in portion 23 in the first receiving portion 211 is improved, and the safety is high. The structure of the present disclosure is simple, and the mounting method is simple and easy to operate, which allows a single person to complete the mounting operation of the ceiling lamp 200, saves time and effort, improves mounting efficiency and safety, and reduces mounting cost.

The present disclosure is to provide a ceiling lamp mounting structure and a ceiling lamp, which enables a single person to quickly mount a large ceiling lamp and facilitates after-sales maintenance.

The present disclosure provides a ceiling lamp mounting structure, the ceiling lamp mounting structure includes a bottom frame assembly, a sliding assembly, and a connection assembly, the bottom frame assembly is fixed on a mounting wall, the connection assembly is fixedly connected with a lamp main body, the connection assembly is detachably connected with the bottom frame assembly through the sliding assembly, the sliding assembly includes a sliding rail and a sliding rod, the sliding rail is fixedly connected with the bottom frame assembly, one end of the sliding rod is movably connected with the sliding rail, and the other end of the sliding rod is rotatably connected with the connection assembly.

As a further improvement of the present disclosure, the sliding rail includes a first receiving portion and a second receiving portion, and the second receiving portion is formed by extending the first receiving portion to a direction away from the bottom frame assembly, a projection area of a connection portion between the first receiving portion and the second receiving portion on the sliding rail is smaller than a projection area of the first receiving portion on the sliding rail.

As a further improvement of the present disclosure, a plug-in portion is provided at an end of the sliding rod close to the sliding rail, the plug-in portion is matched and connected with the first receiving portion, and the plug-in portion slides and/or rotates relatively in the first receiving portion under a drive of the sliding rod.

As a further improvement of the present disclosure, the sliding assembly further includes an anti-drop piece and a fixed position-stopping piece, the second receiving portion is provided with a third plug-in hole, and the anti-drop piece is movably arranged in the third plug-in hole; the fixed position-stopping piece passes through the bottom frame assembly and is fixedly connected with the sliding rail, and is exposed in the first receiving portion.

As a further improvement of the present disclosure, the connection assembly includes a supporting piece, an auxiliary piece, and a locking assembly, and the auxiliary piece and the locking assembly are fixedly connected with two ends of the supporting piece, respectively, an end of the auxiliary piece away from the locking assembly is rotatably connected with an end of the sliding rod away from the plug-in portion.

As a further improvement of the present disclosure, the auxiliary piece is provided with a first buckle portion, and the bottom frame assembly is provided with a second buckle portion at a position corresponding to the first buckle portion, and the second buckle portion is in a buckle connection with the first buckle portion.

As a further improvement of the present disclosure, the bottom frame assembly is provided with a keep-space portion matching with the auxiliary piece in shape at a position corresponding to the auxiliary piece.

As a further improvement of the present disclosure, the bottom frame assembly is provided with a locking opening at a position corresponding to the locking assembly, and the locking assembly passes through the locking opening and is connected with the bottom frame assembly in a lock catch manner.

As a further improvement of the present disclosure, the locking assembly includes an elastic piece, a locking tongue, a locking tongue sleeve for receiving the locking tongue, and a fixing piece, the locking tongue sleeve includes a flat plate, and the locking tongue is provided with a matching hole at a side close to the flat plate, one end of the elastic piece is matched and connected with the matching hole, and the other end of the elastic piece abuts against an inner wall of the flat plate, the locking tongue is elastically connected with the flat plate through the elastic piece; the locking tongue is provided with a sliding groove that is matched with the fixing piece, and the locking tongue is slidably connected with the locking tongue sleeve through a relative sliding of the fixing piece in the sliding groove.

The disclosure further discloses a ceiling lamp, the ceiling lamp includes a lamp main body and the above-mentioned ceiling lamp mounting structure, the lamp main body includes a chassis, the chassis includes a bottom surface and a side wall extending from the bottom surface in a direction away from the lamp main body, the side wall and the bottom surface delimit a receiving cavity, the ceiling lamp mounting structure is received in the receiving cavity, and the bottom frame assembly of the ceiling lamp mounting structure is fixedly connected with the side wall of the chassis.

The beneficial effects of the present disclosure are as follows. The present disclosure realizes the pre-hanging of the ceiling lamp through the cooperation of the sliding assembly, the connection assembly, and the bottom frame assembly, and a single person can complete the connection with the mains power and the fixing of the ceiling lamp, thereby realizing the quick mounting of a large ceiling lamp by a single person, and facilitating after-sales maintenance. Moreover, by arranging the first buckle portion and the second buckle portion, the lamp main body is hooked on the bottom frame assembly, thereby freeing both hands and connecting with the mains power. By arranging that the locking assembly is connected with the locking opening in a locking catch manner, the self-locking connection effect between the lamp main body and the bottom frame assembly is achieved. Furthermore, by providing the anti-drop piece, the stability of the plug-in portion in the first receiving portion is improved, and the safety is high. The structure of the present disclosure is simple, which allows a single person to complete the mounting operation of the ceiling lamp, saves time and effort, improves mounting efficiency and safety, and reduces a mounting cost.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above examples are only used to illustrate but not to limit the technical scheme of the disclosure. Although the disclosure has been described in detail with reference to the examples, it should be understood by ordinary person in the field that the technical scheme of the disclosure can be modified or replaced by equivalents without departing from the spirit and scope of the technical scheme of the disclosure.

The invention claimed is:

1. A ceiling lamp mounting structure, comprising:

a bottom frame assembly, a sliding assembly, and a connection assembly, and wherein:

the bottom frame assembly is fixed on a mounting wall, the connection assembly is fixedly connected with a lamp main body, the connection assembly is detachably connected with the bottom frame assembly through the sliding assembly, the sliding assembly comprises a sliding rail and a sliding rod, the sliding rail is fixedly connected with the bottom frame assembly, one end of the sliding rod is movably connected with the sliding rail, and the other end of the sliding rod is rotatably connected with the connection assembly, wherein the sliding rail comprises a first receiving portion and a second receiving portion, and the second receiving portion is formed by extending the first receiving portion to a direction away from the bottom frame assembly.

2. The ceiling lamp mounting structure according to claim 1, wherein:

a projection area of a connection portion between the first receiving portion, and the second receiving portion on the sliding rail is smaller than a projection area of the first receiving portion on the sliding rail.

3. The ceiling lamp mounting structure according to claim 2, wherein a plug-in portion is provided at an end of the sliding rod close to the sliding rail, the plug-in portion is matched and connected with the first receiving portion, and the plug-in portion slides and/or rotates relatively in the first receiving portion under a drive of the sliding rod.

4. The ceiling lamp mounting structure according to claim 2, wherein the sliding assembly further comprises an anti-drop piece and a fixed position-stopping piece, the second receiving portion is provided with a third plug-in hole, and the anti-drop piece is movably arranged in the third plug-in hole; the fixed position-stopping piece passes through the bottom frame assembly and is fixedly connected with the sliding rail, and is exposed in the first receiving portion.

5. The ceiling lamp mounting structure according to claim 3, wherein the connection assembly comprises a supporting piece, an auxiliary piece, and a locking assembly, and the auxiliary piece and the locking assembly are fixedly connected with two ends of the supporting piece, respectively, an end of the auxiliary piece away from the locking assembly is rotatably connected with an end of the sliding rod away from the plug-in portion.

6. The ceiling lamp mounting structure according to claim 5, wherein the auxiliary piece is provided with a first buckle portion, and the bottom frame assembly is provided with a second buckle portion at a position corresponding to the first buckle portion, and the second buckle portion is in a buckle connection with the first buckle portion.

7. The ceiling lamp mounting structure according to claim 6, wherein the bottom frame assembly is provided with a keep-space portion matching with the auxiliary piece in shape at a position corresponding to the auxiliary piece.

8. The ceiling lamp mounting structure according to claim 5, wherein the bottom frame assembly is provided with a locking opening at a position corresponding to the locking assembly, and the locking assembly passes through the locking opening and is connected with the bottom frame assembly in a lock catch manner.

9. The ceiling lamp mounting structure according to claim 5, wherein:

the locking assembly comprises an elastic piece, a locking tongue, a locking tongue sleeve for receiving the locking tongue, and a fixing piece, the locking tongue sleeve comprises a flat plate, and the locking tongue is provided with a matching hole at a side close to the flat plate, one end of the elastic piece is matched and connected with the matching hole, and the other end of the elastic piece abuts against an inner wall of the flat plate, the locking tongue is elastically connected with the flat plate through the elastic piece; the locking tongue is provided with a sliding groove that is matched with the fixing piece, and the locking tongue is slidably connected with the locking tongue sleeve through a relative sliding of the fixing piece in the sliding groove.

10. A ceiling lamp, comprising a lamp main body and a ceiling lamp mounting structure, and wherein:

the ceiling lamp mounting structure comprises a bottom frame assembly, a sliding assembly, and a connection assembly, and wherein: the bottom frame assembly is fixed on a mounting wall, the connection assembly is fixedly connected with a lamp main body, the connection assembly is detachably connected with the bottom frame assembly through the sliding assembly, the sliding assembly comprises a sliding rail and a sliding rod, the sliding rail is fixedly connected with the bottom frame assembly, one end of the sliding rod is movably connected with the sliding rail, and the other end of the sliding rod is rotatably connected with the connection assembly, wherein the sliding rail comprises a first receiving portion and a second receiving portion, and the second receiving portion is formed by extending the first receiving portion to a direction away from the bottom frame assembly; and the lamp main body comprises a chassis, the chassis comprises a bottom surface and a side wall extending from the bottom surface in a direction away from the lamp main body, the side wall and the bottom surface delimit a receiving cavity, the ceiling lamp mounting structure is received in the receiving cavity, and the bottom frame assembly of the ceiling lamp mounting structure is fixedly connected with the side wall of the chassis.

* * * * *